May 27, 1930. A. O. BUCKIUS 1,760,396
SHOCK ABSORBING MECHANISM
Filed Aug. 3, 1927
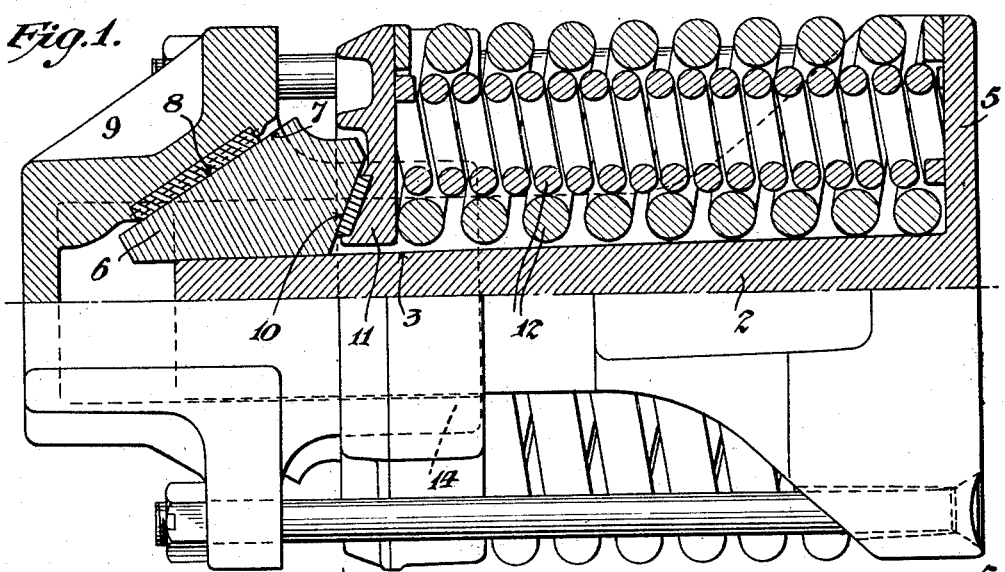
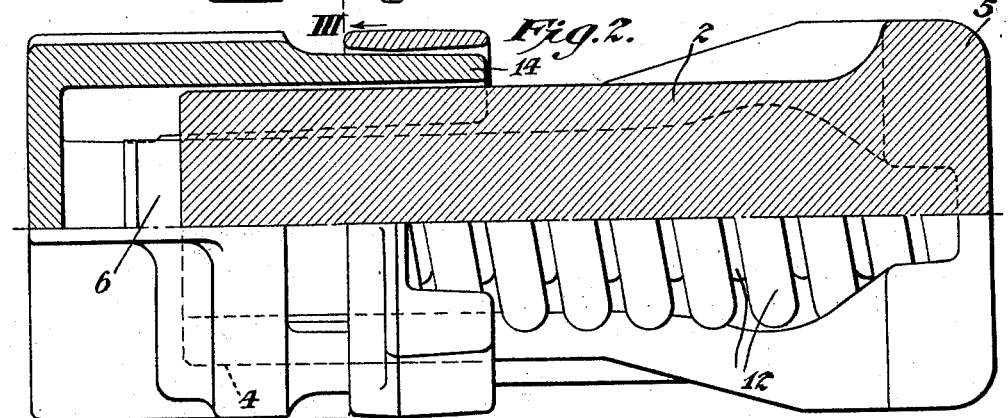
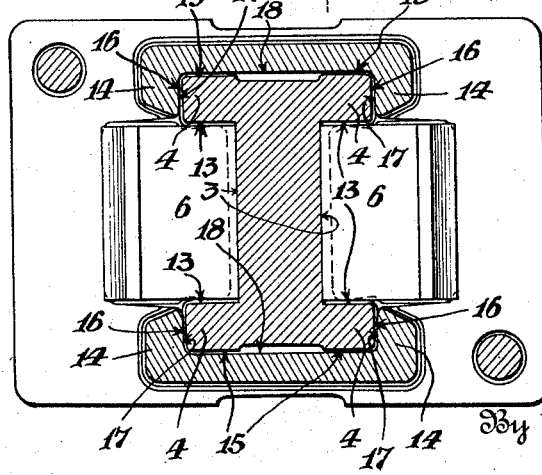
Inventor
Albert O. Buckius
By his Attorney
Clarence D Kerr Patented May 27, 1930

1,760,396

UNITED STATES PATENT OFFICE

ALBERT O. BUCKIUS, OF CLEVELAND, OHIO, ASSIGNOR TO NATIONAL MALLEABLE AND STEEL CASTINGS COMPANY, OF CLEVELAND, OHIO, A CORPORATION OF OHIO

SHOCK-ABSORBING MECHANISM

Application filed August 3, 1927. Serial No. 210,230.

My invention relates to shock absorbing mechanism of the included friction type, in which the friction shoes are intended to generate friction by being pressed against a central member by wedging means. It has been customary to use V-shaped friction surfaces on the central member and friction shoes, but such V-shaped friction surfaces are required to be finished very accurately and the tendency in machining such V-shaped faces is to cause the cutter to wear out more rapidly at some points than at others, with the result that if great care is not used the friction faces will not be accurately formed. To obviate these difficulties I have constructed the central member in the form of an I-bar in which the friction faces are flat instead of V-shaped and are preferably arranged upon the sides of the web of the I-bar, while the ends and flanges of the I-bar serve as reinforcements and as guiding means to keep the friction shoes, wedge and segment seat in alignment with the included friction member during operation. My invention also comprises various features which I shall hereinafter describe and claim.

In the accompanying drawings, Fig. 1 is a plan, half in section, of a gear embodying my invention; Fig. 2 is an elevation, half in section, thereof; and Fig. 3 is a cross-section on lines III—III of Fig. 2.

Referring more specifically to the drawings, the central friction member 2 is preferably in the form of an I-bar having at its sides longitudinally inclined frictional surfaces 3. The flanged portions 4 of the I-bar act as reinforcements to stiffen it and take up the over-solid blows, and also act as guides for the shoes and wedge elements relative to the column. The bar terminates at its rear end in an enlarged base 5. Friction shoes 6 seat upon each friction face 3 between the flanges 4. Each friction shoe 6 has a wedging surface 7 engaged by the surface 8 on the wedge follower 9. The rear face of each shoe has a bearing 10 for an intermediate follower or segment seat 11, which on its rear face forms a bearing for the spring elements 12. The spring elements 12 bear at their rear ends against the inner surface of the base 5.

The shoes 6 are guided by the inner surfaces 13 of the flanges 4 of the I-bar, while the wedge 9 has two rearwardly extending guiding extensions 14 which are U-shaped and extend rearwardly from the wedge and form bearings for the exterior surfaces 15 and sides 16 respectively of the flanges 4. These guiding extensions 14 extend rearwardly through the segment seat 11 and thereby give an extended guiding contact for the wedge upon the central member, and also assist in maintaining the segment seat in alignment with the other parts. Lateral tilting of the wedge relative to the central member is prevented by the engagement of the vertical surfaces 17 on the guiding extensions 14 with the vertical surfaces 16 on the flanges 4, while vertical tilting is prevented by the horizontal guiding surfaces 15 and 18 on the column and wedge, respectively. Where desired, these guiding surfaces may be machined to provide close and accurate fitting.

My invention provides a gear which not only has sufficient frictional capacity, but also is sufficiently massive, by reason of its I-bar cross-section, to withstand the heavy over-solid blows to which such gears are now subjected. In addition, my improved gear is easier to manufacture than the usual included friction type with V-shaped friction faces, since standard milling cutters may be used because of the flat friction faces.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In frictional shock absorbing mechanism, a longitudinally extending included friction member of I-bar form having at the sides of its web portion a plurality of longitudinally extending friction faces; friction shoes engaging the friction member; a pair of followers engaging each of the shoes, said followers also having cooperating telescoping guiding surfaces to maintain the said followers in alignment with the central member; and a compression spring element arranged to resist the inward movement of the shoes and followers relative to the friction member.

2. In frictional shock absorbing mechanism, a longitudinally extending included friction member of I-bar form having at the sides of its web portion a plurality of longitudinally extending friction surfaces; friction shoes engaging the friction member; a wedge member engaging each of the shoes, said wedge member also having U-shaped guiding surfaces engaging complementary surfaces on the central member to maintain the wedge and central member in alignment; and a compression spring element arranged to resist the inward movement of the shoes and wedge relative to the friction member.

3. In frictional shock absorbing mechanism, a longitudinally extending included friction member, friction shoes engaging said friction member; a wedge member and a follower member engaging each of said shoes; a spring element between said follower member and a portion of said included friction member; said wedge member having extensions for guiding said wedge relative to said friction member; said follower member surrounding said extensions and being guided thereby.

ALBERT O. BUCKIUS.